United States Patent [19]
Tsuchiya et al.

[11] Patent Number: 6,098,866
[45] Date of Patent: Aug. 8, 2000

[54] DIFFUSION BONDING APPARATUS FOR PIPES

[75] Inventors: Masaki Tsuchiya, Yokkaichi; Takao Shimizu, Nagoya, both of Japan

[73] Assignee: Daido Tokushuko Kabushiki Kaisha, Aichi, Japan

[21] Appl. No.: 09/050,463

[22] Filed: Mar. 31, 1998

[30] Foreign Application Priority Data

| Jun. 6, 1997 | [JP] | Japan | 9-165076 |
| Oct. 31, 1997 | [JP] | Japan | 9-316263 |
| Feb. 24, 1998 | [JP] | Japan | 10-060524 |

[51] Int. Cl.⁷ .................. B23K 37/00; B23K 1/18; B23K 20/00; B21D 39/00; B25B 1/00
[52] U.S. Cl. .................. 228/44.5; 228/173.4; 228/173.5; 228/193; 228/212; 228/49.3; 269/156; 269/239; 269/268; 279/4.12; 279/106
[58] Field of Search ............... 228/173.2, 173.4, 228/193, 212, 4.1, 9, 44.3, 44.5, 45, 47.1, 48, 49.1, 49.3; 269/43, 239, 156, 268; 279/4.11, 4.12, 106

[56] References Cited

U.S. PATENT DOCUMENTS

| 3,088,746 | 5/1963 | Highberg et al. | 279/110 |
| 3,890,482 | 6/1975 | DiBenedetto | 219/73 |
| 4,370,541 | 1/1983 | De Sivry et al. | 219/121 EC |
| 4,414,454 | 11/1983 | Zollinger | 219/53 |
| 4,459,727 | 7/1984 | Burton et al. | 29/238 |
| 4,490,081 | 12/1984 | Kuchuk-Yatsenko et al. | 409/300 |
| 4,565,003 | 1/1986 | McLeod | 29/281.1 |
| 4,576,324 | 3/1986 | Takimoto et al. | 228/44.3 |
| 4,753,424 | 6/1988 | Sato et al. | 269/43 |
| 4,885,450 | 12/1989 | Paton et al. | 219/101 |
| 5,197,335 | 3/1993 | Yamada et al. | 73/825 |
| 5,609,457 | 3/1997 | Burns | 414/22.51 |
| 5,883,361 | 3/1999 | Kellogg et al. | 219/390 |

*Primary Examiner*—Patrick Ryan
*Assistant Examiner*—Kiley Stoner
*Attorney, Agent, or Firm*—Nikaido, Marmelstein, Murray & Oram LLP

[57] ABSTRACT

A diffusion bonding apparatus for pipes that are supplied downward from above comprising a lower block for holding a lower pipe and an upper block for holding and pressing an upper pipe against the lower pipe. In the apparatus, three or more hydrraulic cylinders are provided in a lifting member of the upper block about a joint where the upper pipe is held in such manner that the cylinders are located in a circumference of a circle.

10 Claims, 7 Drawing Sheets

DIFFUSION BONDING APPARATUS FOR PIPES

BACKGROUND OF THE INVENTION

The present invention relates to a diffusion bonding apparatus for pipes, more particularly a diffusion bonding apparatus for pipes capable of diffusion bonding a pipe that is supplied from above with a pipe that is placed in position therebelow by evenly pressing them against each other.

Conventionally, because of a superior quality in a bonded joint, various products are produced by using diffusion bonding. It is also expected that oil well pipes with bonded joint of a superior quality can be obtained, if the diffusion bonding is used for production of oil well pipes.

Figure 7:
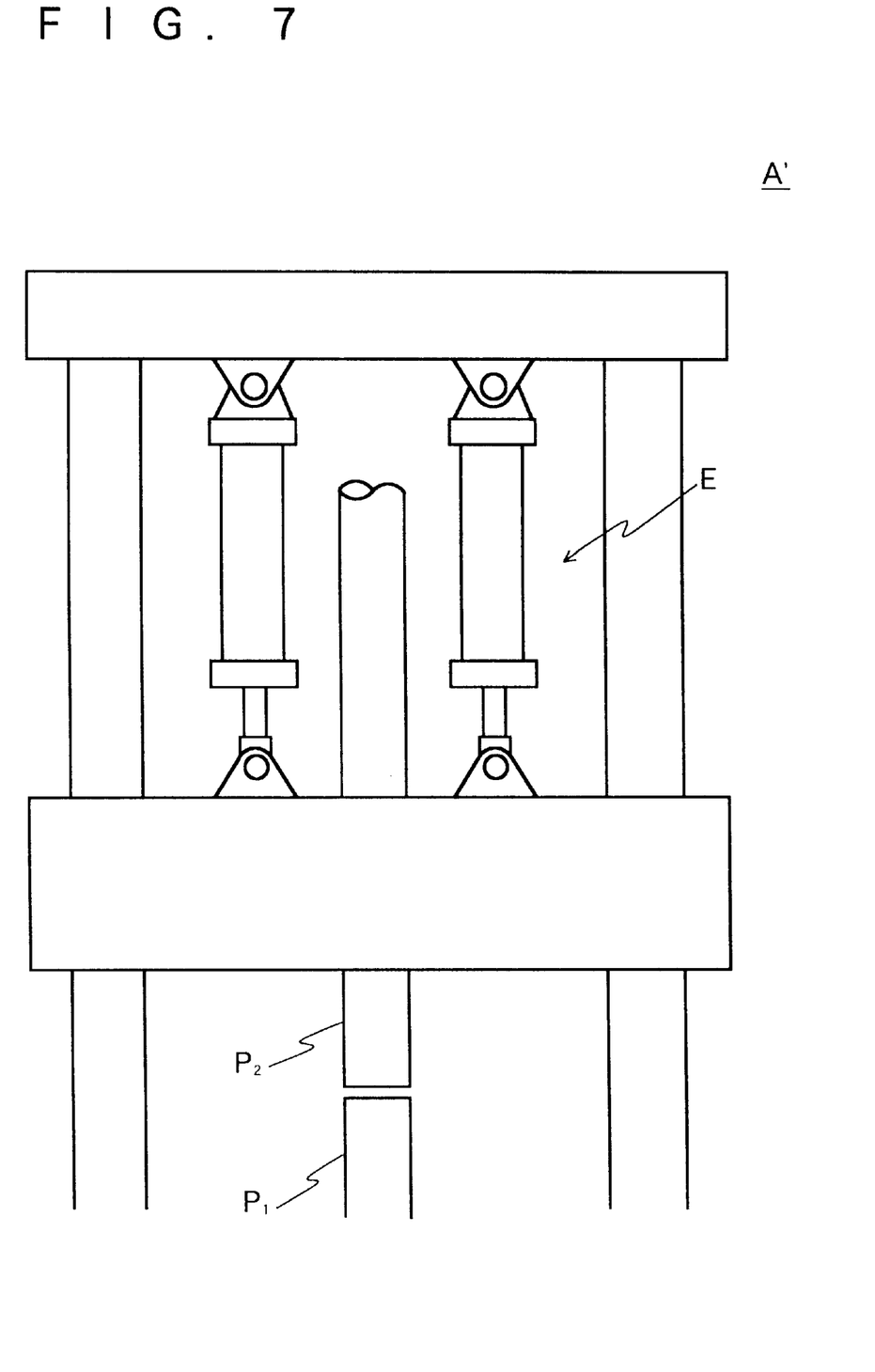
FIG. 7 is a schematic view of an upper mechanism in a conventional vertical diffusion bonding apparatus.

Then, as shown in FIG. 7, according to an apparatus A' for achieving diffusion bonding by vertically holding a pipe (lower pipe) P1 to be bonded, supplying the other pipe (upper pipe) P2 to be bonded therewith downward from above in the vertical direction, allowing an end surface of the upper pipe P2 to be pressed against an end surface of the lower pipe P1 that is held vertically therebelow, then heating the relevant joint for diffusion bonding them, it is considered that such pipe as an oil well pipe extending as far as several kilometers after bonding can be produced. An apparatus of above constitution is herein referred to as a vertical diffusion bonding apparatus A'.

Figure 8:
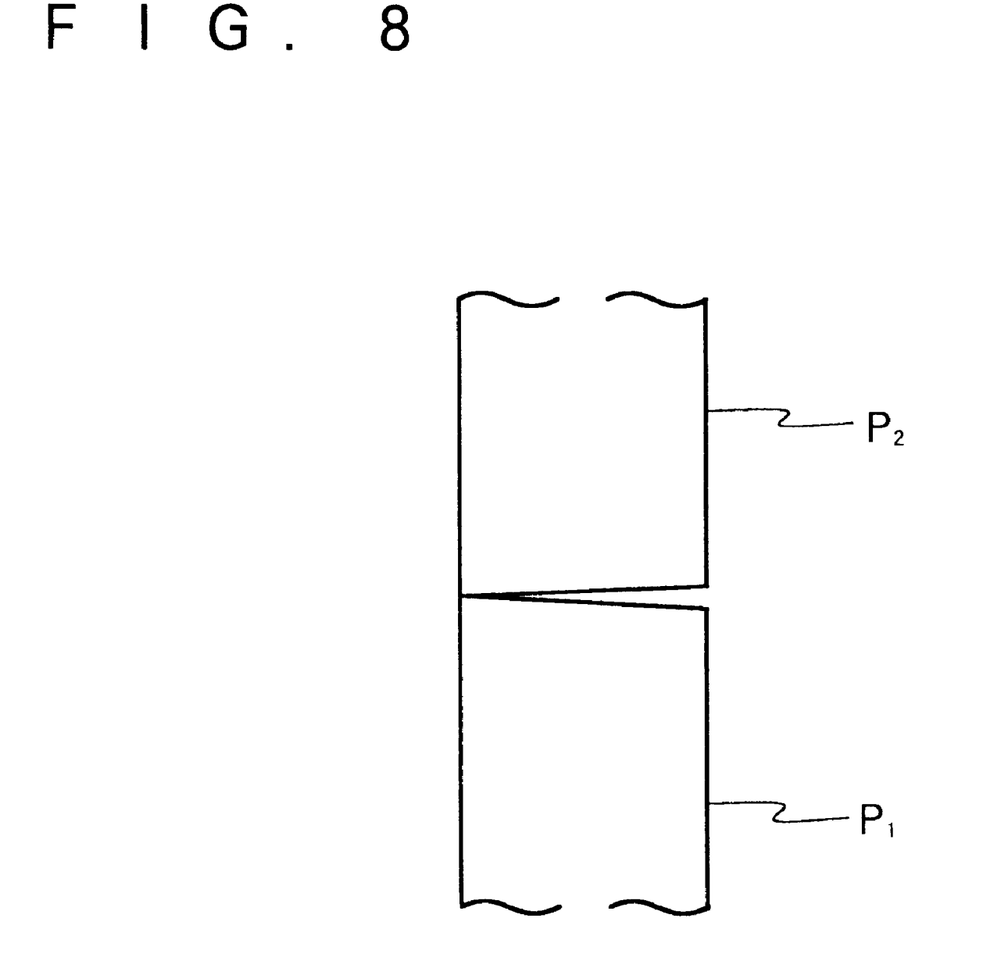
FIG. 8 is an illustration showing presence of a non-contact area between pipes that are brought into contact with each other.

However, in a microscopic view of an end of the pipes P1, P2, as shown in FIG. 8, it is very rare that surfaces to be bonded are exactly at a right angle with respect to a longitudinal center of the pipes P1, P2. Therefore, when the upper pipe P2 is pressed against the lower pipe P1, the pressing force is concentrated in a part of the pipes P1, P2, and the entire area of surfaces to be bonded cannot be evenly pressed against each other by a desired force. As a result, because a desired degree of tightness cannot be achieved, gaps are present in some areas. Then, due to lack of pressing force in such areas, the bonded joint is accordingly reduced in strength after bonding.

The invention has been achieved in view of such problems of the prior art, and it is an object of the invention to provide a diffusion bonding apparatus for pipes capable of achieving diffusion bonding by evenly pressing pipes against each other even when the perpendicularity of end surfaces of the pipes to be bonded with respect to a longitudinal center thereof is somehow low in accuracy.

SUMMARY OF THE INVENTION

A diffusion bonding apparatus for pipes according to the invention allows pipes to be supplied downward from above, and comprises a lower block for holding a lower pipe and an upper block for holding and pressing an upper pipe against the lower pipe, wherein three or more hydraulic cylinders are provided in a lifting member of the upper block about a position where the upper pipe is held in such manner that the cylinders are located in a circumference of a circle.

In a diffusion bonding apparatus for pipes of the invention, it is preferable that three of said hydraulic cylinders are provided, and an angle between the hydraulic cylinders is set within a range of 110 degree to 130 degree with respect to a point of center.

In a preferred aspect of a diffusion bonding apparatus for pipes according to the invention, the upper block comprises horizontal position adjusting means for adjusting a position of the upper pipe that is held by the upper block in a horizontal surface.

In another preferred aspect of a diffusion bonding apparatus for pipes according to the invention, the upper block comprises inclination adjusting means for adjusting inclination of the upper pipe.

In the other preferred aspect of a diffusion bonding apparatus for pipes according to the invention, the lifting member comprises an outer element and an inner element for holding the upper pipe, held in an inner side of the outer element in such manner that it can be horizontally moved and adjusted in inclination.

The horizontal position adjusting means comprises, for example, a horizontally moving member for holding the inner element, held in an inner side of the outer element in such manner that it can be horizontally moved, a first driving screw member provided for spirally moving inward and outward the outer element and a second driving screw member provided at an angle of 90 degree to the first driving screw member for spirally moving inward and outward with respect to the outer element, and a horizontal position of the inner element is adjusted by adjusting a driving amount of the horizontally moving member by means of the first driving screw member and or second driving screw member so that a horizontal position of the upper pipe is thereby adjusted.

The inclination adjusting means comprises, for example, a cylindrical member rotatably held by the horizontally moving member for supporting flange elements that are provided in an outer circumference of the inner element, disc cam members provided concentrically at an angle of 120 degree to the cylindrical member for supporting the flange elements that are provided in the outer circumference of the inner element and a driving mechanism for driving the disc cam members, and a height of the disc cam members supporting the flange elements is adjusted by means of the driving mechanism so that inclination of the upper pipe that is held by the inner element is thereby adjusted.

The inner element comprises, for example, upper clamp means provided in an upper part thereof and lower clamp means provided in an lower part thereof, so that the upper pipe is clamped by the upper clamp means at a desired clamping force, and deformation of a bonded surface of the upper pipe is prevented by the lower clamp means.

It is preferable that a distance between the upper clamp means and lower clamp means is three times or more of a diameter of the upper pipe that is clamped, and the upper clamp means and lower clamp means preferably comprise first, second and third claw blocks that are provided at an angle of 120 degree to each other.

Because a bonding apparatus for pipes according to the invention is constituted as described above, an upper pipe is bonded with a lower pipe while they are evenly pressed against each other. As a result, a quality of bonded joint and a bonding strength are increased.

DETAILED DESCRIPTION OF THE INVENTION

Referring now to the accompanying drawings, an embodiment of the invention is described below by referring to the accompanying drawings, but the invention is not limited to the illustrated embodiment alone.

Figure 1:
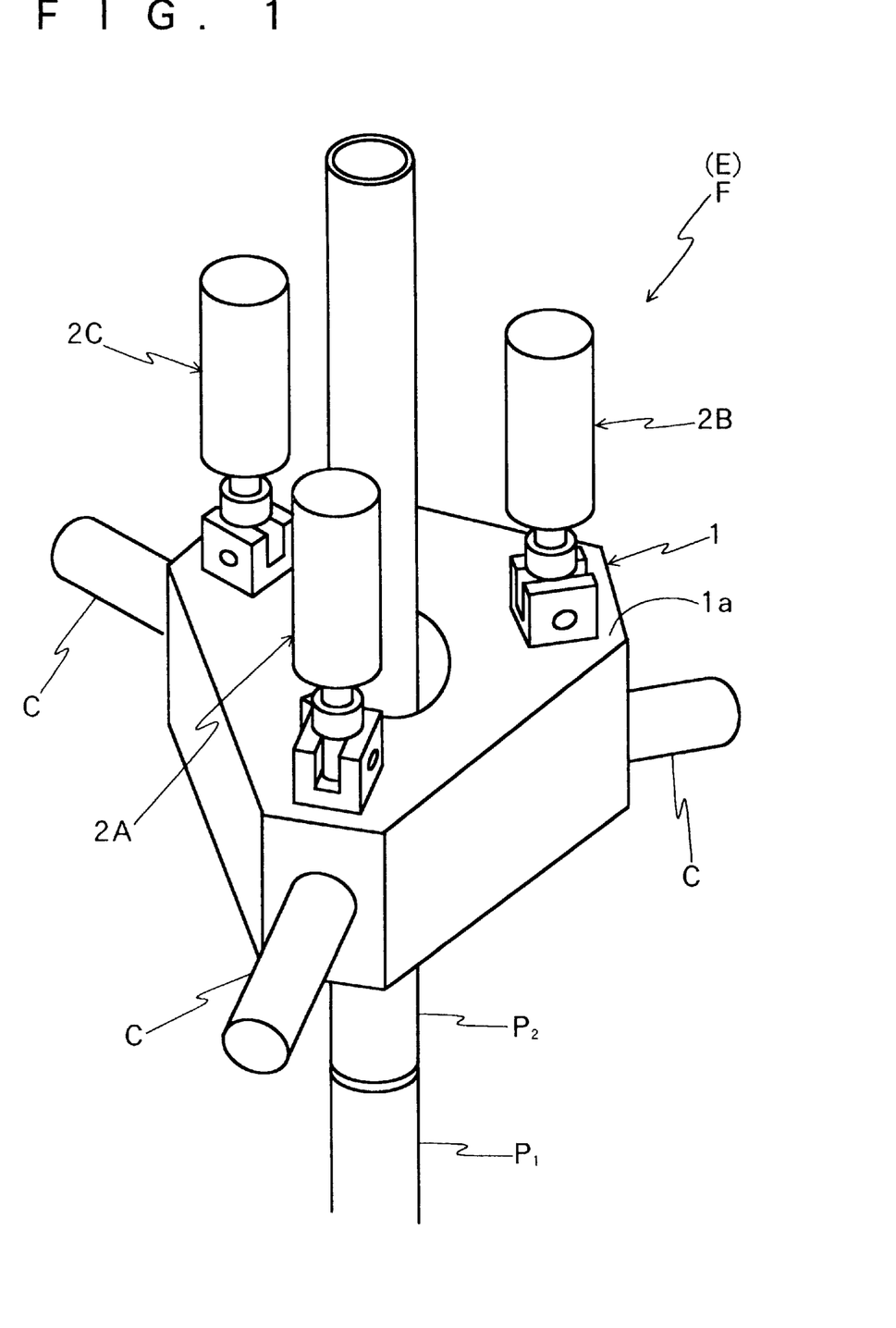
FIG. 1 is a conceptual view of a pressing device applied to a pressing method of the invention.

An embodiment of a pressing device F employed in a vertical bonding apparatus of the invention is shown in a conceptual view in FIG. 1. In the embodiment, the pressing device F is employed in a vertical diffusion bonding apparatus for diffusion bonding pipes P.

The pressing device F consists of three sets of hydraulic cylinders 2, that is, a first hydraulic cylinder 2A, a second hydraulic cylinder 2B and a third hydraulic cylinder 2C provided in an upper surface 1a of a lifting member 1 that incorporates clamp means (not clearly shown) for clamping an upper pipe P2 in an upper mechanism (not shown) for supplying vertically from above the pipe (upper pipe) P2 to be bonded with a pipe (lower pipe) P1 that is held and placed in position by a lower mechanism (not shown) of the vertical diffusion bonding apparatus at a same distance from a center of the lifting member about which the upper pipe P2 is clamped and an angle of 120 degree from each other. In other words, it consists of three sets of hydraulic cylinders 2 provided at an angle of 120 degree from each other in a circumference of a circle that is centered about a center about which the upper pipe P2 is clamped in the upper surface 1a of lifting member 1. The hydraulic cylinders 2 serve as the pressing device F for pressing the upper pipe P2 against the lower pipe P1, while they also serve as a lifting device E for vertically moving the lifting member 1. In FIG. 1, a reference symbol C shows a driving cylinder of the clamp means.

Now, operation of pressing the upper pipe P2 against the lower pipe P1 by the pressing device F of above constitution is described.

(1) By driving the first hydraulic cylinder 2A, second hydraulic cylinder 2B and third hydraulic cylinder 2C, the lifting member 1 is moved downward for allowing a lower end of the upper pipe P2 to be in contact with an upper end of the lower pipe P1.

(2) By increasing hydraulic pressures of the first hydraulic cylinder 2A, second hydraulic cylinder 2B and third hydraulic cylinder 2C, the upper pipe P2 is pressed against the lower pipe P1. In the embodiment, because the first hydraulic cylinder 2A, second hydraulic cylinder 2B and third hydraulic cylinder 2C are arranged as described above, by using a same hydraulic pressure for the first, second and third hydraulic cylinders 2A, 2B and 2C, an end surface of the upper pipe P2 is evenly pressed against an end surface of the lower pipe P1.

Thus, according to the pressing device F of the embodiment, since three sets of hydraulic cylinders 2 are provided at a same distance from a center of the lifting member 1 about which the upper pipe P2 is clamped thereby and an angle of 120 degree from each other, the end surface of upper pipe P2 can be evenly pressed against the end surface of lower pipe P1 by such simple operation of using a same hydraulic pressure for the hydraulic cylinders 2.

Figure 2:
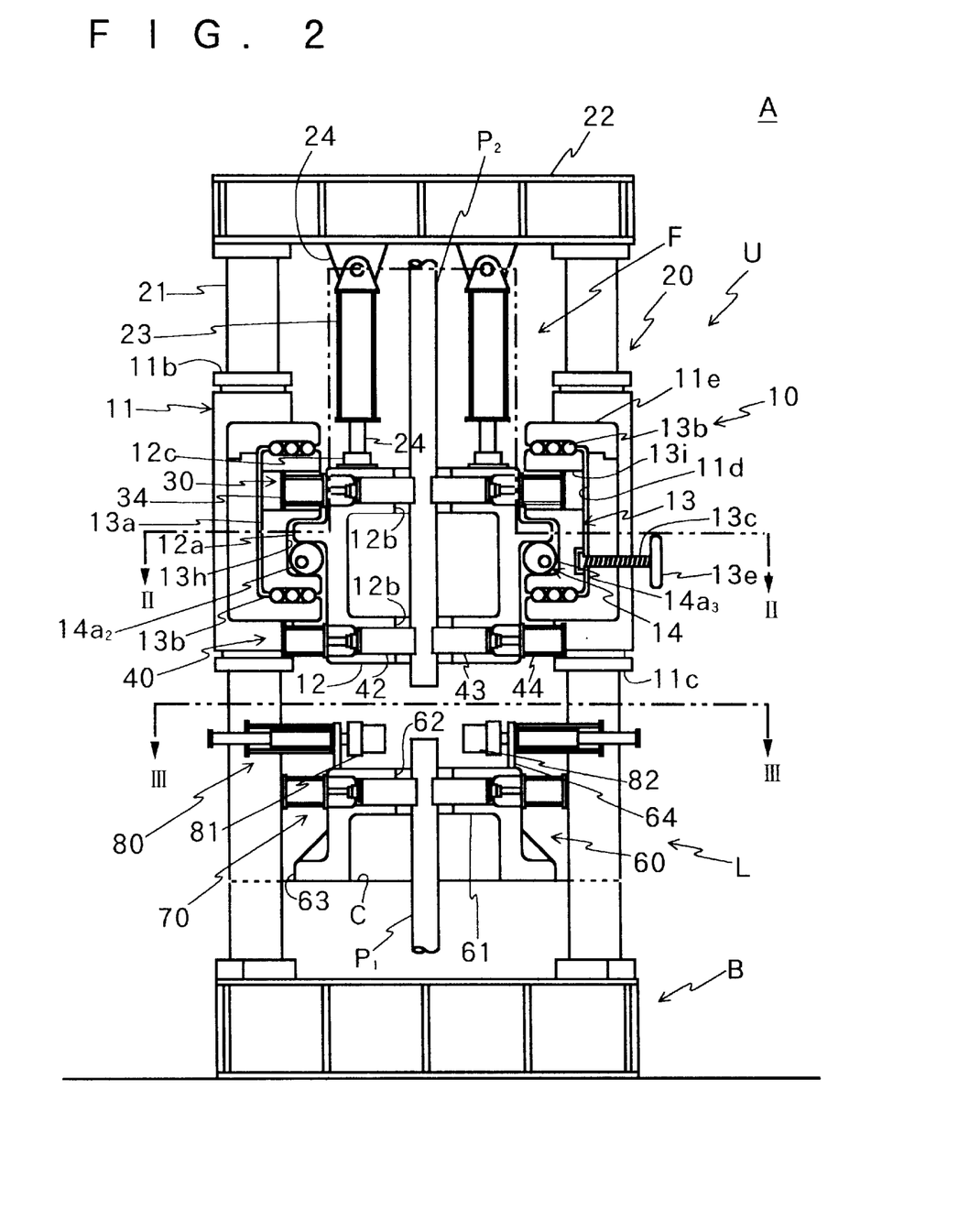
FIG. 2 is a schematic front view of a diffusion bonding apparatus according to an embodiment of the invention.

In FIG. 2, a schematic view of a diffusion bonding apparatus with the pressing device F is shown, where the diffusion bonding apparatus is so-called vertical diffusion bonding apparatus A for vertically supplying pipes P to be bonded from above, and diffusion bonding them, and mainly comprises an upper block U vertically movable for supplying the pipes P and a lower block L for holding the lower pipe P1 that is bonded with the upper pipe P2 supplied by the upper block U.

The upper block U mainly comprises a main body (lifting member) 10 of the upper block, a lifting and pressing mechanism 20 for lifting and pressing the main body 10, a first clamping mechanism (upper clamping mechanism) 30 provided in an upper part of the main body 10 and a second clamping mechanism (lower clamping mechanism) 40 provided in a lower part of the main body 10.

The lifting and pressing mechanism 20 mainly comprises, in detail, four cylindrical guide posts 21 arranged in a rectangular shape on a base B, four main beams 22 arranged in a rectangular shape over top parts of the guide posts 21, the pressing device F with three sets of hydraulic cylinders 23, that is, the first hydraulic cylinder 23A, second hydraulic cylinder 23B and third hydraulic cylinder 23C provided concentrically at an angle of 120 degree from each other and support beams (not clearly shown) connected in an appropriate arrangement with the main beams 22 for supporting the hydraulic cylinders 23A, 23B and 23C of the pressing device F downward through support members 24. Thus, by providing three sets of hydraulic cylinders 23 at a regular interval, three-point pressing is achieved, and a pressure can be evenly distributed in a circumference of an end surface of the pipe P to be bonded, as described above.

The main body (lifting member) 10 of the upper block mainly comprises an outer element 11 and an inner element 12 with a main part thereof provided inside the outer element 11, and incorporates a horizontal position adjusting mechanism 13 for adjusting a horizontal position of the inner element 12 and an inclination adjusting mechanism 14 for adjusting inclination of the inner element 12.

The outer element 11 is in the shape of a rectangular parallelepiped with a hollow area for housing the inner element 12 provided in the inside and a lengthwise surface cut off through a specified width. At four corners of the rectangular parallelepiped, guide post through holes 11a for slidably attaching the guide posts 21 to the outer element 11 are formed. An upper end 11b and a lower end 11c of the guide post receiver ha are projected to a specified height from upper and lower surfaces of the rectangular parallelepiped that constitutes the outer element 11, and an outer circumference thereof is also projected in an arcuate shape from a corner of the rectangular parallelepiped (see FIG. 3). Further, an inner surface of the rectangular parallelepiped constituting the outer element 11 is cut off to a specified depth through a specified width, and a groove-like cavity 11d is formed in the inner surface thereof.

A horizontally moving member 13a of the horizontal position adjusting mechanism 13 is provided in the groove-like cavity lid, and multiple bearing balls 13b are placed in a space between upper and lower surfaces of the horizontally moving member 13a and upper and bottom surfaces of the groove-like cavity 11d in the outer element 11 through an entire circumference thereof in order to allow horizontal movement of the horizontally moving member 13a. To prevent the bearing balls 13b from coming out of the space, the upper and lower surfaces of horizontally moving member 13a is provided with a concave joint of an appropriate depth in an area where the bearing balls 13b are placed. In the embodiment, as shown in FIG. 2, the upper and bottom surfaces of the groove-like cavity 11d in the outer element 11 may be also provided with a concave joint of such width that assures horizontal movement of the horizontally moving member 13a in an area where the bearing balls 13b are placed. A part formed with the concave joint of an upper part of the outer element 11 is formed as a lid 11e for removability. Because of such constitution of the outer element 11, placement of the bearing balls 13b and attachment of the horizontally moving member 13a is facilitated.

Figure 3:
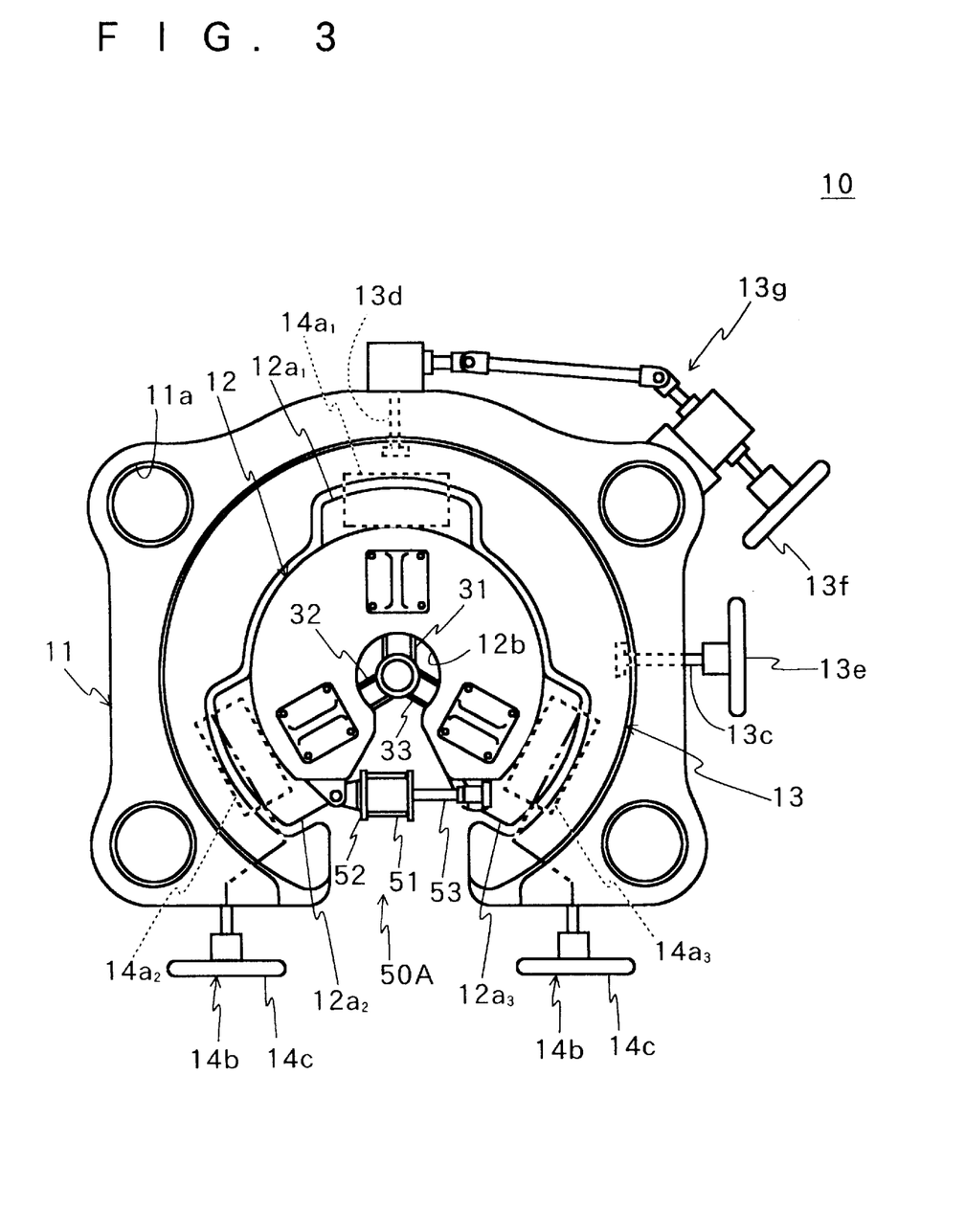
FIG. 3 is a sectional view taken along a line II—II in FIG. 2.
Figure 6:
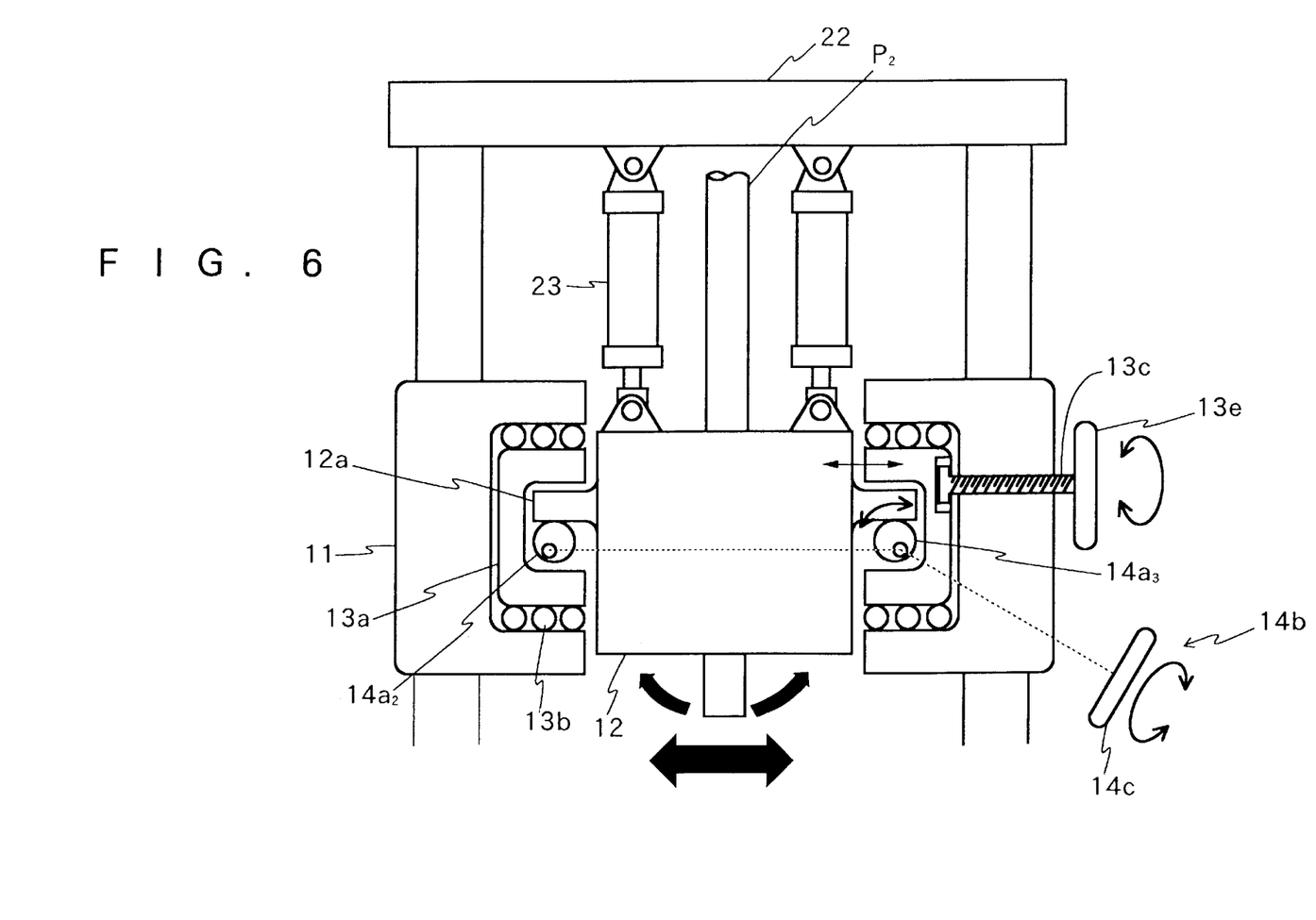
FIG. 6 is an illustration for explaining operation of a horizontal position adjusting mechanism and an inclination adjusting mechanism.

The horizontally moving member 13a is horizontally moved by means of driving screw members 13c and 13d that are provided in appropriate positions in widthwise and lengthwise sides of the outer element 11, respectively, as shown in FIGS. 2 to 3 and 6, and physically connected at an end thereof with the horizontally moving member 13a (see FIG. 6). For example, as the end of driving screw member 13c is brought into contact with the horizontally moving member 13a, and further advanced by rotating a handle 13e of the driving screw member (X-axis driving screw member) 13c that is provided in the widthwise side in FIG. 3 in the specified direction, the horizontally moving member 13a is horizontally moved leftward in the figure. On the contrary, when the driving screw member 13c in contact with the horizontally moving member 13a is retracted by rotating the handle 13e in the opposite direction, as the end of driving screw member 13c connected with the horizontally moving member 13a is also retracted, the horizontally moving member 13a is moved rightward in the figure. Alternatively, as the end of driving screw member 13d is brought into contact with the horizontally moving member 13a, and further advanced by rotating a handle 13f of the driving screw member (Y-axis driving screw member) 13d that is provided in the lengthwise side in FIG. 3 in the specified direction, the horizontally moving member 13a is horizontally moved downward in the figure in a manner similar to that described above. On the contrary, when the driving screw member 13d in contact with the horizontally moving member 13a is retracted by rotating the handle 13f in the opposite direction, the horizontally moving member 13a is moved upward in the figure in a manner similar to that already described.

As shown in FIG. 3, in the embodiment, for operating convenience of the handle 13f, the handle 13f of driving screw member (Y-axis driving screw member) 13d provided in the lengthwise side is located in the vicinity of the handle 13e of driving screw member (X-axis driving screw member) 13c provided in the widthwise side, and the driving screw member 13d is adapted to be rotated by a driving force transmission mechanism 13g.

In an inner surface of a lower part of the horizontally moving element 13a, a groove-like cavity 13h is provided. Then, in an upper part of the groove-like cavity 13h, three flange elements 12a formed in a side of the inner element 12 are provided with a specified spacing from the upper surface of groove-like cavity 13h. These three flange elements 12a are a first flange element 12a1 formed in consistency with the direction of Y-axis, and a second flange element 12a2 and a third flange element 12a3 formed at an angle of 120 degree from the first flange element 12a1, respectively. Below the first, second and third flange elements 12a1, 12a2 and 12a3, respectively, a first inclination adjusting member 14a1, a second inclination adjusting member 14a2 and a third inclination adjusting member 14a3 of the inclination adjusting mechanism 14 are provided in contact with a lower surface of the flange members 12a1, 12a2 and 12a3. Out of the first to third inclination adjusting members 14a1, 14a2 and 14a3, the second and third inclination adjusting members 14a2 and 14a3 are disc cams. By rotating the disc cams to a specified extent in the specified direction through driving force transmission mechanisms 14b, an angle of inclination of the inner element 12 is adjusted (see FIG. 6). Handles 14c of the driving force transmission mechanisms 14b are provided in a same lengthwise side for operating convenience thereof (see FIG. 3).

The inner element 12 is cut out in a sectoral shape in a part corresponding to the cut-out joint of the outer element 11, is in the shape of a hollow cylinder with a circular through-hole 12b provided in the upper and lower surfaces for insertion of the upper pipe P2, and is formed in a side thereof with the first, second and third flange elements 12a1, 12a2 and 12a3 in positions corresponding to the groove-like cavities 13h of the horizontally moving member 13a, as described above. Further, in the upper surface of inner element 12, three connecting members 12c connected with front ends of piston rods 24 of the hydraulic cylinders 23 in the lifting and pressing mechanism 20 are concentrically provided at a regular interval. These three connecting members 12c are a first connecting member 12c1 provided in consistency with the direction of Y-axis and a second connecting member 12c2 and a third connecting member 12c3 provided at an angle of 120 degree from the first connecting member 12c1, respectively.

Additionally, in upper and lower parts of the inner element 12, a first clamping mechanism (upper clamping mechanism) 30 and a second clamping mechanism (lower clamping mechanism) 40 are provided, respectively. The first clamping mechanism 30 serves for clamping the upper pipe P2 in such manner that a specified clamping force can be obtained during diffusion bonding, and comprises, in detail, a first clamping claw 31 provided in consistency with the direction of Y-axis, movable together with the inner element 12 and capable of being advanced and retracted with respect to the upper pipe P2 and a second clamping claw 32 and a third clamping claw 33 provided, respectively, at an angle of 120 degree from the first clamping claw 31, also movable together with the inner element 12 and capable of being advanced and retracted with respect to the upper pipe P2. Advancing and retracting movement of the first, second and third clamping claws 31, 32 and 33 is achieved, for example, as they are driven by the hydraulic cylinders 34 (see FIG. 2). In the case the first, second and third clamping claws 31, 32 and 33 are driven by the hydraulic cylinders, for allowing projection of the hydraulic cylinders 12 beyond the outer circumference of inner element 12, cavities 13i for accommodating the hydraulic cylinders are provided in the horizontally moving member 13a in correspondence with the hydraulic cylinders 34 (see FIG. 2).

The second clamping mechanism 40 is for preventing deformation of an end to be bonded of the upper pipe P2, and comprises, similarly to the first clamping mechanism 30, a first clamping claw provided in consistency with the direction of Y-axis, movable together with the inner element and capable of being advanced and retracted and a second clamping claw 42 and a third clamping claw 43 provided, respectively, at an angle of 120 degree from the first clamping claw, also movable together with the inner element 12 and capable of being advanced and retracted. In the embodiment, positions of attachment of the first clamping claw, second clamping claw 42 and third clamping claw 43 to the inner element 12 is adjusted such that hydraulic cylinders 44 for driving the first clamping claw, second clamping claw 42 and third clamping claw 43 is located below the bottom surface of rectangular parallelepiped constituting the outer element 11. A spacing between the first clamping mechanism 32 and second clamping mechanism 40 is set at three times or more, preferably five times or more of the diameter of upper pipe P2. By providing such spacing, a clamping force of the first clamping mechanism 30 has almost no effect on deformation the end surface of upper pipe P2.

Incidentally, because the inner element 12 is provided with the sectoral cut-out joint, as described above, a deformation preventing mechanism 50A is provided at two, upper and lower, locations in a side of the cut-out joint for preventing the cut-out joint from being enlarged by a reactive force when the upper pipe P2 is clamped by the first and second clamping mechanisms 30 and 40. The deformation preventing mechanism 50A practically consists of a hydraulic cylinder 51, and a base 52 of the hydraulic cylinder 51 is pivotally attached to an end of the cut-out joint, while a leading end of piston rod 53 thereof is secured to the other end so that deformation the inner element 12 as it is clamped by the first and second clamping mechanisms 30 and 40 is prevented by a tensile force thereof.

The lower block L mainly comprises a main body 60 of the lower block, a third clamping mechanism 70 provided in an upper part of the main body 60, an induction heating device 80 placed above the main body 60 and an end surface finishing device 90 positioned in a side of the main body 60. Although the end surface finishing device 90 is also applicable to the pipe P with an unfinished end surface, it is mainly used for repairing such damage as nick caused in an end surface of the pipe P that is supplied after the end surface is finished.

The main body 60 of lower block consists of a hat-shaped member 61 with a through-hole 62 provided in a central joint of upper surface thereof for allowing insertion of the pipe P, and a flange 63 of the main body is placed on a lower clamping device G for clamping the lower pipe P1, and fixed thereto. The hat-shaped member 61 is formed with a cut-out joint similar to the cut-out joint in the inner element 12 of the main body 60 of upper block at a location corresponding thereto and a deformation preventing mechanism 50B constituted similarly to the deformation preventing mechanism 50A in an upper part thereof for preventing deformation of the main body 60 when the lower pipe P1 is clamped by the third clamping mechanism 70.

Similarly to the first and second clamping mechanisms 30 and 40, the third clamping mechanism 70 comprises a first clamping claw 71 provided in consistency with the direction of Y-axis and capable of being advanced and retracted with respect to the lower pipe P1 and a second clamping claw 72 and a third clamping claw 73 provided, respectively at an angle of 120 degree from the first clamping claw 71 and capable of being advanced and retracted with respect to the lower pipe P1.

The induction heating device 80 mainly comprises two halves of induction heating coils 81 and 82, and the halves of induction heating coils 81 and 82 are placed in opposition to each other, and held by a holding member 64 employed in an upper surface of the main body 60. The induction heating coils 81, 82 are movable toward and away from the pipe P. Constitution of the induction heating device 80 with two halves of induction heating coils 81 and 82 is disclosed in the prior application (Japanese Patent Application No. 9-74582) of the applicant.

Figure 4:
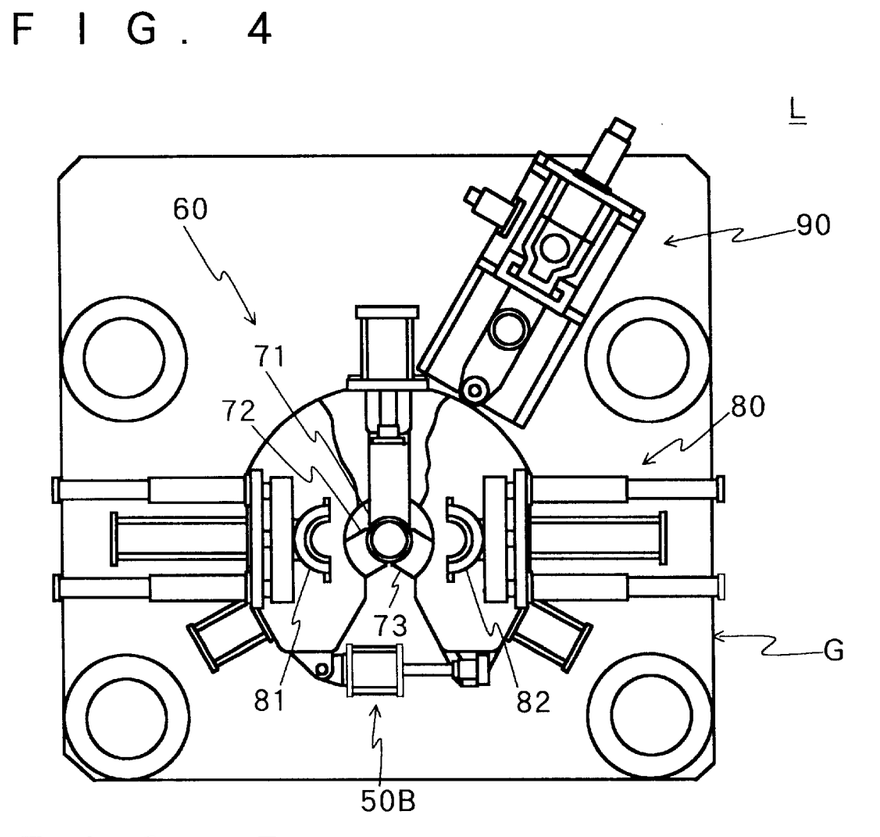
FIG. 4 is a sectional view taken along a line III—III in FIG. 2.
Figure 5:
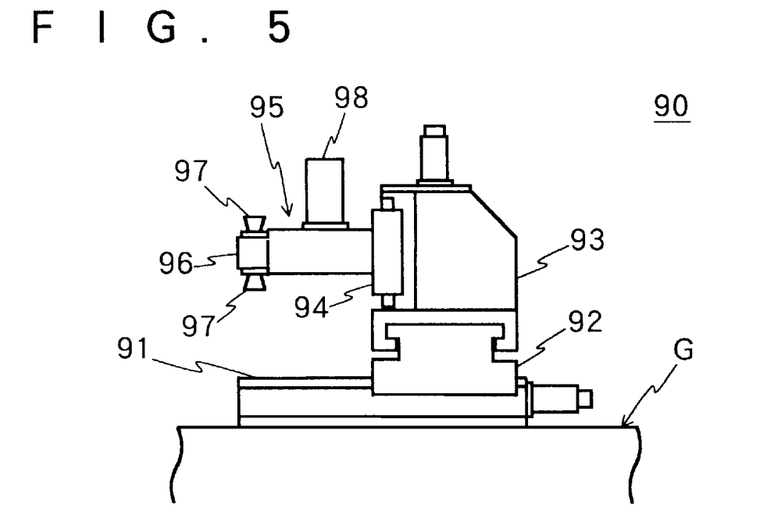
FIG. 5 is a side view of an end surface finishing device.

The end surface finishing device 90 comprises, as shown in FIGS. 4 and 5, a rail 91 of a specified length placed toward the pipe P on the lower clamping device C and fixed thereto, a radial carriage 92 movable along the rail 91, a transverse carriage 93 provided in the radial carriage 92 and movable transversely to the moving direction of the radial carriage 92, a lifting member 94 located in a front part of the transverse carriage 93 for vertical movement and an end surface finishing mechanism 95 projected forward from the lifting member 94.

The end surface finishing device 95 mainly comprises, as shown in FIG. 5, a rotary-type finishing tool 96 with cutting blades 97 provided at upper and lower ends thereof, a motor 98 for rotating the rotary-type finishing tool 96 and torque transmitting means (not clearly shown) consisting of a timing belt and the like that transmit a torque of the motor 98 to the rotary-type finishing tool 96.

Now, diffusion bonding by the vertical diffusion bonding apparatus A of such constitution is described. Operations described below are conducted in response to instructions from a control unit not shown.

(1) An upper end of the lower pipe P1 with an end surface finished beforehand is placed in a predetermined position, and clamped by the third clamping mechanism 70 and lower clamping device G of the lower block L.

(2) The upper pipe P2 also with an end surface finished beforehand is supplied to the main body 10 of upper block by a pipe-to-be-bonded supply device not shown.

(3) The upper pipe P2 supplied is adjusted in position so that a lower end thereof is projected a predetermined length from the bottom part of main block 10.

(4) After the position adjustment, the upper pipe P2 is clamped by the first and second clamping mechanisms 30 and 40.

(5) The lifting and pressing mechanism 20 is operated for a predetermined period for lowering the main body 10 a predetermined amount in order to provide a predetermined amount of spacing between the lower end of upper pipe P2 and upper end of lower pipe P1.

(6) The upper and lower pipes P1 and P2 are inspected visually or by using an instrument for presence or absence of such damage as nick in the end surface. If a nick or any damage is found in the end surface during the inspection, the nick or damage is removed according to below procedure. In contrast, if no nick or damage is found during the inspection, a procedure from and after step (11) is conducted.

(7) By driving the radial carriage 92 of end surface finishing device 90, the rotary-type finishing tool is positioned between the upper and lower pipes P2 and P1.

(8) The lifting member 94 is vertically moved, and set in a predetermined position in the vicinity of the end surface of pipe P in which the nick or damage is found.

(9) By operating the radial carriage 92 and transverse carriage 93 appropriately, the damage in the end surface of pipe P is repaired by the rotary-type finishing tool 96.

(10) After the damage in the end surface of pipe P is repaired, the lifting member 94 is vertically moved a predetermined amount, and the rotary-type finishing tool 96 is removed from between the upper and lower pipes P2 and P1 by driving the radial carriage 92.

(11) Any offset between the upper and lower pipes P2 and P1 is checked visually or by using an instrument, and the horizontal position adjusting mechanism 13 is operated appropriately, if any offset is present, for canceling the offset.

(12) A degree of parallelism of lower end of the upper pipe P2 with respect to the upper end of lower pipe P1 is checked visually or by using an instrument, and the inclination adjusting mechanism 14 is operated appropriately, if they are not parallel with each other, for bringing about a predetermined degree of parallelism. The predetermined degree of parallelism is, for example, such that a desired degree of tightness can be obtained by compressive forces of the first, second and third hydraulic cylinders 23A, 23B and 23C described below.

(13) A filler plate (not shown) is applied to the end surface of lower pipe P1.

(14) By driving the lifting and pressing mechanism 20, the main body 10 is lowered, and the lower end of upper pipe P2 is brought into contact with the upper end of lower pipe P1.

(15) The compressive force of first, second and third hydraulic cylinders 23A, 23B and 23C are increased to reach a predetermined pressing force. In the operation, even if a slight spacing is present in the joint between the lower end of upper pipe P2 and upper end of lower pipe P1, it is automatically reduced in size, as the pressing force of first, second and third hydraulic cylinders 23A, 23B and 23C is balanced, and the end surfaces of upper and lower pipes P2 and P1 comes to be evenly in tight contact with each other.

(16) The induction heating coils 81 and 82 of induction heating device 80 is advanced toward the joint between the pipes P1 and P2, and integrated with each other.

(17) An electric power is supplied from a power supply not shown to the induction heating coils 81 and 82, and the bonding joint is heated for a predetermined period. Accordingly, the pipes are bonded at the bonding surface.

(18) After the pipes are bonded at the joint, the pipes P clamped by the first, second and third clamping mechanisms 30, 40 and 70 and the lower clamping device G are released therefrom, and the pipes P bonded are fed out in the downward direction by a feeding device not shown.

(19) then the upper end of upper pipe P2 to be bonded reaches a predetermined position above the lower block L, the feeding operation is discontinued, and the pipe P are clamped by the third clamping mechanism 70 and lower clamping device G.

After then, the procedure is repeatedly conducted, and a predetermined length of pipe can be obtained.

As described above, according to the vertical diffusion bonding apparatus A with the pressing device F of the invention, since the upper pipe P2 and lower pipe P1 is held evenly in tight contact with each other during diffusion bonding, they are evenly bonded. Further, as a result, a desired strength can be achieved at the bonded surface.

Although the invention has been described by referring to an embodiment above, the invention is not limited to the embodiment, and can be modified in various manners. For example, in the pressing device according to the embodiment, although three sets of hydraulic cylinders are placed at a regular interval of an angle of 120 degree, they may not be positioned exactly at a regular interval of 120 degree, and the spacing between them may slightly vary. For example, they may be placed at an appropriate angle within a range of 110 degree to 130 degree from each other. By way of example, a spacing between the first and second hydraulic cylinders may be 110 degree, a spacing between the second and third hydraulic cylinders may be 130 degree, and a spacing between the third and first hydraulic cylinders may be 120 degree. Provision of three sets of hydraulic cylinders is not restrictive, and four or five sets of hydraulic cylinders may be provided. Although the end surface of upper pipe can be more evenly pressed against the end surface of lower pipe as more hydraulic cylinders are provided, it is not preferable to employ too many hydraulic cylinders, because increase in the number of hydraulic cylinders results in a more complicated structure. In the embodiment, although a vertical diffusion bonding apparatus is provided as a bonding apparatus, the invention is not limited to a vertical diffusion bonding apparatus, can be applied to a lateral diffusion bonding apparatus, is not limited to a diffusion bonding apparatus either, and can be applied to various bonding apparatuses.

As described in detail above, according to the invention, because a bonding surface of an upper pipe can be evenly pressed against a bonding surface of a lower pipe during diffusion bonding, such superior effect of increasing a quality and a strength of the joint can be obtained.

What is claimed is:

1. A diffusion bonding apparatus for pipes that are supplied downward from above, comprising a lower block for holding a lower pipe and an upper block for holding and pressing an upper pipe against the lower pipe, wherein three or more hydraulic cylinders are provided in a lifting member of the upper block about a position where the upper pipe is held in such manner that the cylinders are located in a circumference of a circle.

2. The diffusion bonding apparatus for pipes of claim 1, wherein three hydraulic cylinders are provided and an angle between each of the hydraulic cylinders is set within a range of 110 degrees to 130 degrees relative to a point of center of the lifting member.

3. The diffusion bonding apparatus for pipes of claim 1, wherein the upper block comprises horizontal position adjusting means for adjusting a position of the upper pipe that is held by the upper block in a horizontal surface.

4. The diffusion bonding apparatus for pipes of claim 1, wherein the upper block comprises inclination adjusting means for adjusting inclination of the upper pipe.

5. The diffusion bonding apparatus for pipes of claim 1, wherein the lifting member comprises an outer element and an inner element for holding the upper pipe, held in an inner side of the outer element in such manner that it can be horizontally moved and adjusted in inclination.

6. The diffusion bonding apparatus for pipes of claim 3, wherein the horizontal position adjusting means comprises a horizontally moving member that holds an inner element therein, the horizontally moving member is held in an outer element such that the horizontally moving member can be horizontally moved relative to the outer element, a first driving screw member horizontally moves the horizontally moving member relative to the outer element and a second driving screw member provided at an angle 90 degrees about a circumference of the horizontal positioning means relative to the first driving screw member vertically moves the horizontally moving member relative to the outer element, wherein a horizontal position of the inner element within the horizontally moving member is adjusted by adjusting a driving amount of the horizontally moving member using at least one of the first driving screw member and the second driving screw member, whereby a horizontal position of the upper pipe is adjusted.

7. The diffusion bonding apparatus for pipes of claim 4, wherein the inclination adjusting means comprises a cylindrical member rotatably held by the horizontally moving member, the cylindrical member supports a plurality of flange elements provided about an outer circumference of the inner element, disc cam members am provided about the outer circumference of the inner element at an angle of 120 degrees relative to the cylindrical member, the disc cam members support the flange elements and are driven by a driving mechanism, and a height of the disc cam members is adjusted by the driving mechanism to adjust inclination of the upper pipe held by the inner element.

8. The diffusion bonding apparatus for pipes of claim 5, wherein the inner element comprises an upper clamp in an upper part thereof and a lower clamp in a lower part thereof, the upper pipe is clamped by the upper clamp at a desired clamping force, and deformation of a bonded surface of the upper pipe is prevented by the lower clamp.

9. The diffusion bonding apparatus for pipes of claim 8, wherein a distance between the upper clamp and the lower clamp is larger by a factor of at least three relative to a diameter of the clamped upper pipe.

10. The diffusion bonding apparatus for pipes of claim 8, wherein the upper clamp and the lower clamp each comprise first, second and third claw blocks provided about an outer circumference of the clamped upper pipe at an angle of 120 degrees relative to each other.

* * * * *